United States Patent
Ota et al.

(10) Patent No.: US 10,782,159 B2
(45) Date of Patent: Sep. 22, 2020

(54) DETECTION DEVICE AND DETECTION METHOD

(71) Applicant: YAMAHA CORPORATION, Hamamatsu-shi (JP)

(72) Inventors: Tetsuo Ota, Hamamatsu (JP); Rei Furukawa, Yokohama (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 272 days.

(21) Appl. No.: 16/116,183

(22) Filed: Aug. 29, 2018

(65) Prior Publication Data

US 2019/0011293 A1 Jan. 10, 2019

Related U.S. Application Data

(63) Continuation of application No. PCT/JP2017/005258, filed on Feb. 14, 2017.

(30) Foreign Application Priority Data

Mar. 1, 2016 (JP) .................................. 2016-038804

(51) Int. Cl.
*G01D 5/34* (2006.01)
*G10H 1/055* (2006.01)
(Continued)

(52) U.S. Cl.
CPC ............... *G01D 5/342* (2013.01); *G06F 3/02* (2013.01); *G06F 3/0304* (2013.01);
(Continued)

(58) Field of Classification Search
CPC ........ G01D 5/342; G10H 1/0553; G10H 1/18; G10H 1/34; G10H 1/0016; G10H 1/344;
(Continued)

(56) References Cited

U.S. PATENT DOCUMENTS

| | | |
|---|---|---|
| 5,909,028 A | 6/1999 | Yamamoto |
| 2005/0145781 A1 | 7/2005 | Ura et al. |

(Continued)

FOREIGN PATENT DOCUMENTS

| | | |
|---|---|---|
| EP | 1553559 A2 | 7/2005 |
| JP | H09152871 A | 6/1997 |
| JP | 2005195794 A | 7/2005 |

OTHER PUBLICATIONS

Extended European Search Report issued in European Appln. No. 17759642.6 dated Aug. 30, 2019.

(Continued)

*Primary Examiner* — Seung C Sohn
(74) *Attorney, Agent, or Firm* — Rossi, Kimms & McDowell LLP

(57) ABSTRACT

A detection device includes: a movement detector that includes light emitters and light receivers, wherein in accordance with movement of a moving body among moving bodies, each corresponding to a different combination of a light emitter and a light receiver, a light reception level of the light receiver in a combination corresponding to the moving body changes; and a processor coupled to a memory storing instructions that, when executed by the processor, configure the processor to: cause each of the light emitters to sequentially emit light in each light emission period by providing a driving signal, and cause a signal level of the driving signal to differ between unit periods within the light emission period; and select, for each light emission period, a light reception level in one of the unit periods within the light emission period as a detected value for each of the light receivers.

6 Claims, 5 Drawing Sheets

(51) Int. Cl.
  *G06F 3/02* (2006.01)
  *G10H 1/18* (2006.01)
  *G06F 3/03* (2006.01)
  *G10H 1/34* (2006.01)
  *G10H 1/00* (2006.01)

(52) U.S. Cl.
  CPC ......... *G10H 1/0016* (2013.01); *G10H 1/0553* (2013.01); *G10H 1/18* (2013.01); *G10H 1/34* (2013.01); *G10H 1/344* (2013.01); *G10H 2220/295* (2013.01); *G10H 2220/305* (2013.01)

(58) Field of Classification Search
  CPC ........ G10H 2220/295; G10H 2220/305; G06F 3/02; G06F 3/0304
  USPC ...................................... 250/222.1
  See application file for complete search history.

(56) References Cited

U.S. PATENT DOCUMENTS

| | | |
|---|---|---|
| 2009/0151548 A1 | 6/2009 | Kikumoto |
| 2009/0282962 A1* | 11/2009 | Jones ................. G10H 1/344 |
| | | 84/21 |
| 2011/0273700 A1 | 11/2011 | Lambert |
| 2018/0136364 A1* | 5/2018 | Kare ................ H01S 5/423 |

OTHER PUBLICATIONS

International Search Report issued in Intl. Appln No. PCT/JP2017/005258 dated May 9, 2017. English translation provided.
Written Opinion issued in Intl. Appln. No. PCT/JP2017/005258 dated May 9, 2017.

\* cited by examiner

DETECTION DEVICE AND DETECTION METHOD

CROSS REFERENCE TO RELATED APPLICATIONS

This application is a Continuation Application of PCT Application No. PCT/JP2017/005258, filed Feb. 14, 2017, and is based on and claims priority from Japanese Patent Application No. 2016-038804, filed Mar. 1, 2016. The contents of the above applications are incorporated herein by reference in their entirety.

BACKGROUND OF THE INVENTION

Field of the Invention

The present invention relates to a technique for detecting movement of moving bodies, such as keys of a keyboard instrument.

Description of the Related Art

In a detection device for optically detecting movement of moving bodies such as keys of a keyboard instrument, there is a problem that variabilities exist in characteristics of light receiving elements or light emitting elements due to manufacturing variability or aging. Japanese Patent Application Laid-Open Publication No. 2005-195794 (hereafter Patent Document 1) discloses a technique in which, in a configuration where movement of operating elements is detected by combinations of light emitters and light receivers, a light emission level of each light emitter and a light reception level of each light receiver are adjusted. In the technique disclosed in Patent Document 1, the light emission level of each light emitter is determined such that no output signal from the light receivers exceeds a predetermined threshold value, and a largest light reception signal that is below the threshold value under a particular light emission level is selected as an output signal from among light reception signals derived by dividing a voltage that accords with a light reception level of a light receiver.

Even if a light emission level is adjusted to a particular value for each light emitter, as in the technique disclosed in Patent Document 1, variabilities in light reception levels of light receivers when a light emitter emits light are not compensated. With a view to reducing variabilities in the light reception levels of light receivers, in the technique disclosed in Patent Document 1 a configuration is used to select one of light reception signals generated in parallel in accordance with the light reception level of each light receiver. However, in the above configuration, it is necessary to use a voltage-dividing circuit (an array of resistive elements) for generating light reception signals by dividing a voltage that accords with the light reception level of a light receiver; and also to use an integrated circuit (multiplexer) for sequentially selecting a light reception signal from the light reception signals for each emission of light by a light emitter. As a result, the configuration of the device is made complex.

SUMMARY OF THE INVENTION

Taking into account the circumstances discussed above, it is an object of the present invention to accurately detect movement of moving bodies while preventing the configuration of the device from becoming overly complex.

To solve the above problem, a detection device according to a preferred mode of the present invention includes: a movement detector that includes light emitters and light receivers, wherein in accordance with movement of a moving body among moving bodies, each moving body corresponding to a different combination of one of the light emitters and one of the light receivers, a light reception level of the light receiver in a combination corresponding to the moving body changes; and a processor coupled to a memory storing instructions that, when executed by the processor, configure the processor to: cause each of the light emitters to sequentially emit light in each light emission period by providing a driving signal, and cause a signal level of the driving signal to differ between unit periods within the light emission period; and select, for each light emission period, a light reception level in one of the unit periods within the light emission period as a detected value for each of the light receivers.

A detection method according to a preferred mode of the present invention is implemented in a computer that controls a movement detector configured to include light emitters and light receivers, wherein in accordance with movement of a moving body among moving bodies, each moving body corresponding to a different combination of one of the light emitters and one of the light receivers, a light reception level of a light receiver in a combination corresponding to the moving body changes, the detection method including: causing each of the light emitters to sequentially emit light in each light emission period by providing a driving signal, and causing a signal level of the driving signal to differ between unit periods within the light emission period; and selecting, for each light emission period, a light reception level in one of the unit periods within the light emission period as a detected value for each of the light receivers.

DESCRIPTION OF THE EMBODIMENTS

First Embodiment

Figure 1:
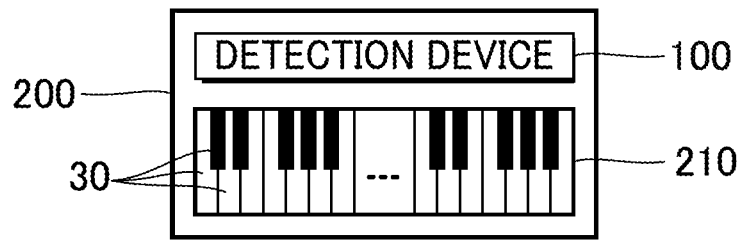
FIG. 1 is a diagram showing a configuration of a keyboard instrument in a first embodiment of the present invention.

FIG. 1 is a diagram showing a configuration of a keyboard instrument 200 according to a first embodiment of the present invention. As shown in the example in FIG. 1, the keyboard instrument 200 in the first embodiment includes a keyboard 210 and a detection device 100. The keyboard 210 is configured to include multiple keys 30 (e.g., 88 keys) including white keys and black keys.

Figure 2:
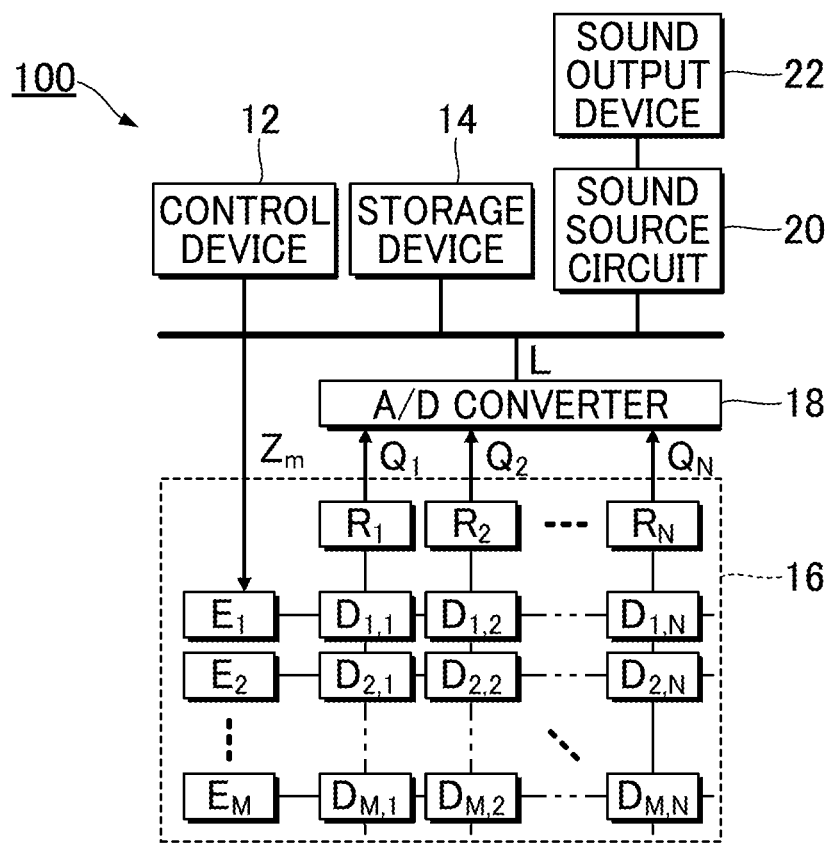
FIG. 2 is a diagram showing a configuration of a detection device in the first embodiment of the present invention.

FIG. 2 is a diagram showing a configuration of the detection device 100 according to the first embodiment of the present invention. The detection device 100 of the first embodiment is a sensor that is used in the keyboard instrument 200 to optically detect movement of each of the keys 30. As shown in the example in FIG. 2, the detection device 100 of the first embodiment includes a control device 12, a storage device 14, a movement detector 16, an A/D converter 18, a sound source circuit 20, and a sound output device 22.

The control device 12 is realized by use of processing circuitry, such as a CPU (central processing unit) or an FPGA (field-programmable gate array), and centrally controls each element in the detection device 100. The storage device 14 stores a program executed by the control device 12 together with various data used by the control device 12. A publicly known recording medium, such as a semiconductor recording medium or a magnetic recording medium, or a combination of various types of recording media may be used as the storage device 14.

The movement detector 16 detects movement of each key 30 of the keyboard instrument 200 (specifically, displacement of each key 30 when pressed by a player), and includes multiple (M) light emitters $E_1$ to $E_M$ and multiple (N) light receivers $R_1$ to $R_N$ (M and N are each a natural number equal to or greater than two). A light emitter $E_m$ (m=1 to M) is configured to include a light emitting element, such as a LED (light emitting diode), and emits light (hereafter referred to as "detection light") by being provided with a driving signal $Z_m$. A light receiver $R_n$ (n=1 to N) is configured to include a light receiving element, such as a photodiode, and generates a detection signal $Q_n$ that accords with a light reception level.

The M light emitters $E_1$ to $E_M$ and the N light receivers $R_1$ to $R_N$ form a sensor matrix of M rows and N columns (e.g., 12 rows×8 columns). A detector $D_{m,n}$ is disposed in correspondence with a combination of a light emitter $E_m$ and a light receiver $R_n$. Each detector $D_{m,n}$ corresponds to a different key 30 of the keyboard 210. A correspondence relationship between each detector $D_{m,n}$ and each key 30 may be freely determined. For illustrative purposes, in FIG. 2, a detector $D_{m,n}$ is illustrated for every combination of a light emitter $E_m$ and a light receiver $R_n$. In reality, however, a combination may exist for which a detector $D_{m,n}$ is not disposed.

Figure 3:
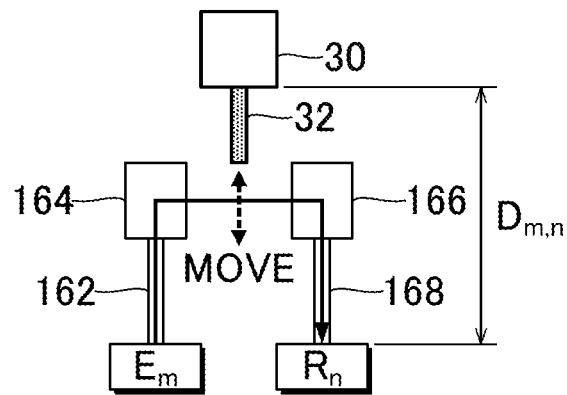
FIG. 3 is a schematic diagram of a detector.

FIG. 3 is a schematic diagram showing a freely-chosen exemplary detector $D_{m,n}$. As shown in the example of FIG. 3, a detector $D_{m,n}$ is a sensor head that includes a light emission path 162, a light guide 164, a light guide 166, a light reception path 168, and a light shield 32. The light emission path 162 and the light reception path 168 are each a path through which detection light propagates, and are each configured to include an optical fiber, for example. Detection light emitted from a light emitter $E_m$ propagates through the light emission path 162 to reach the light guide 164, and exits to the side of the light guide 166 by being reflected inside the light guide 164. The detection light that enters the light guide 166 from the light guide 164 then enters the light reception path 168 by being reflected inside the light guide 166, and propagates through the light reception path 168 to reach a light receiver $R_n$. A light shield 32 is, for example, a light-shielding shutter that is fixed to the bottom of each key 30 of the keyboard instrument 200. The light shield 32 moves to a space between the light guide 164 and the light guide 166 upon pressing of the corresponding key by a user. Accordingly, a light reception level by each light receiver $R_n$ (a signal level of a detection signal $Q_n$) changes depending on a location (i.e., a key press status) of each key 30.

The detection light emitted from an m-th light emitter $E_m$ is provided to each of the light emission paths 162 of the N detectors $D_{m,1}$ to $D_{m,N}$ corresponding to the m-th row in the movement detector 16. The detection light that has passed through the light reception paths 168 of the M detectors $D_{1,n}$ to $D_{M,n}$ corresponding to an n-th column in the movement detector 16 is received by the n-th light receiver $R_n$. Thus, by detecting a light reception level of each of the N light receivers $R_1$ to $R_N$ at the time of emission of light by a freely chosen light emitter $E_m$, it is possible to detect movement of each key 30 (a status of each detector $D_{m,n}$) corresponding to a combination of the light emitter $E_m$ and each light receiver $R_n$. As is disclosed in Japanese Patent Application Laid-Open Publication No. H09-152871, detection light emitted from a single light emitter $E_m$ may be received by multiple light receivers $R_n$, or detection light emitted from multiple light emitters $E_m$ may be received by a single light receiver $R_n$.

The A/D converter 18 of FIG. 2 converts an analog detection signal $Q_n$ generated by each of the N light receivers $R_1$ to $R_N$ into digital data (hereafter referred to as "light reception level") L. The control device 12 analyzes a status of each key 30 from a time series of light reception levels L, which have undergone conversion by the A/D converter 18. In accordance with a result of analyzing the light reception levels L, the control device 12 generates performance data that specify a time series of status (emitted or muted) and intensity of sound corresponding to each key 30. The performance data are stored in the storage device 14. In other words, performance on the keyboard instrument 200 by the user is recorded. The sound source circuit 20 of FIG. 2 generates an audio signal of performance sound specified by the performance data. The audio signal generated by the sound source circuit 20 is provided to the sound output device 22 (speaker or headphones), thereby causing the performance sound specified by the performance data to be played. Here, a drive mechanism (e.g., solenoid) may drive each key 30 in accordance with the performance data, thereby realizing automatic playing of the keyboard instrument 200. The functions of the sound source circuit 20 may be realized by the control device 12.

Figure 4:
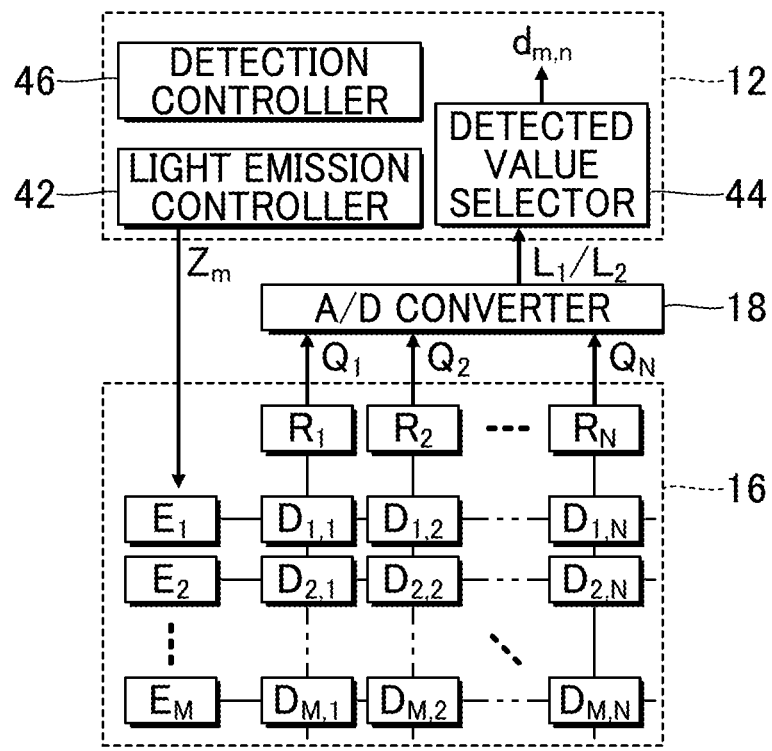
FIG. 4 is a diagram showing a configuration of the detection device with a focus on functions of a control device.

FIG. 4 is a diagram showing a configuration of the detection device 100 with a focus on the functions of the control device 12. As shown in the example of FIG. 4, the control device 12 of the first embodiment serves as elements (a light emission controller 42, a detected value selector 44, and a detection controller 46) for controlling the movement detector 16 by executing the program stored in the storage device 14. Alternatively, the functions of the control device 12 may be distributed among multiple devices, or a part of the functions of the control device 12 may be realized by a dedicated electronic circuit.

Figure 5:
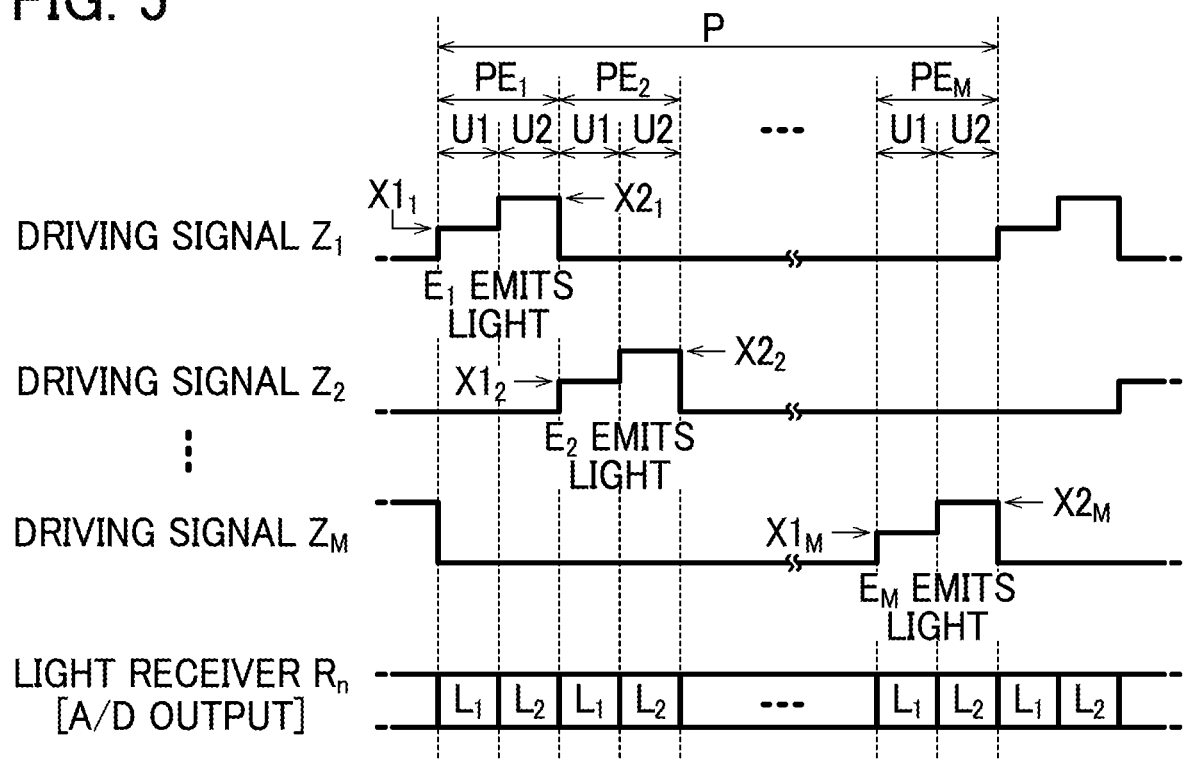
FIG. 5 is an explanatory diagram illustrating operations of a light emission controller.

The light emission controller 42 causes each of the M light emitters $E_1$ to $E_M$ in the movement detector 16 to sequentially emit light. FIG. 5 is an explanatory diagram illustrating control of each light emitter $E_m$ by the light emission controller 42. As shown in the example of FIG. 5, in processing (hereafter referred to as "movement detection processing") SB for detecting movement of each key 30 of the keyboard instrument 200, the light emission controller 42 causes each of the M light emitters $E_1$ to $E_M$ to sequentially emit light in each light emission period $PE_m$. The operation to cause each of the M light emitters $E_1$ to $E_M$ to sequentially emit light is repeated at a predetermined cycle (hereafter referred to as "detection cycle") P. The time length of the detection cycle P is approximately one millisecond, and the time length of a light emission period $PE_m$ is approximately 80 microseconds ($\approx 1/M$). The light emission controller 42 of the first embodiment provides a driving signal $Z_m$ to a light emitter $E_m$ in the m-th light emission period $PE_m$ among the M light emission periods $PE_1$ to $PE_M$ within each detection cycle P, thereby causing the light emitter $E_m$ to emit light. The driving signal $Z_m$ is a current signal that causes the light emitter $E_m$ to emit light.

As shown in FIG. 5, a light emission period $PE_m$ includes a unit period U1 and a unit period U2. For example, the unit period U1 is a first half period of a light emission period $PE_m$, and the unit period U2 is a second half period of the light emission period $PE_m$. The light emission controller 42 of the first embodiment causes a light emission level of a light emitter $E_m$ to differ between the unit period U1 and the unit period U2 within each light emission period $PE_m$. Specifically, the light emission controller 42 causes a signal level (more specifically, an amount of current) of a driving signal $Z_m$ provided to a light emitter $E_m$ to differ between the unit period U1 and the unit period U2, thereby causing the light emission level of the light emitter $E_m$ to vary within the light emission period $PE_m$. As shown in the example of FIG. 5, the signal level $X1_m$ of the driving signal $Z_m$ in the unit period U1 is below the signal level $X2_m$ of the driving signal $Z_m$ in the unit period U2. Accordingly, the light emission level of the light emitter $E_m$ increases in a stepwise manner within the light emission period $PE_m$.

As shown in the above example, in the first embodiment, the light emission level of the light emitter $E_m$ varies within each light emission period $PE_m$. Consequently, a light reception level of each of the N light receivers $R_1$ to $R_N$ differs between the unit period U1 and the unit period U2 within each light emission period $PE_m$. The A/D converter 18 generates a light reception level L by A/D-converting a detection signal $Q_n$ generated by each of the N light receivers $R_1$ to $R_N$ in each of the unit period U1 and the unit period U2 within each light emission period $PE_m$. In other words, the light reception level L1 of a light receiver $R_n$ in the unit period U1 and the light reception level L2 of the light receiver $R_n$ in the unit period U2 are generated for each light emission period $PE_m$ for each of the N light receivers $R_1$ to $R_N$.

The detected value selector 44 of FIG. 4 selects a light reception level L in one of the unit period U1 and the unit period U2 within a light emission period $PE_m$ (that is, selects either the light reception level L1 in the unit period U1 or the light reception level L2 in the unit period U2) as a detected value $d_{m,n}$ for each of the N light receivers $R_1$ to $R_N$. Since a detected value $d_{m,n}$ is a light reception level L of a light receiver $R_n$ in a light emission period $PE_m$ in which a light emitter $E_m$ emits light, the detected value $d_{m,n}$ corresponds to a numerical value that indicates a location (key press status) of a key 30 corresponding to a detector $D_{m,n}$.

The path length from a light emitter $E_m$ to a light receiver $R_n$ (light loss in the light emission path 162 and the light reception path 168) may differ between the N light receivers $R_1$ to $R_N$. A surface condition of an end face of an optical fiber that forms the light emission path 162 or the light reception path 168 may differ for each of the N light receivers $R_1$ to $R_N$. In a configuration using light emitters $E_m$ in each of which the intensity of detection light varies within the plane of a light-emitting face, the light quantity of the detection light entering each light emission path 162 from a light emitter $E_m$ may differ depending on the location of the light emission path 162 relative to the light-emitting face. It is possible that characteristics of a light receiver $R_n$ (e.g., a relationship between an amount of received light and a signal level of a detection signal $Q_n$) may differ for each light receiver $R_n$ due to manufacturing variability or aging. As a result of various differences described above as examples, when a freely chosen light emitter $E_m$ is caused to emit light, light reception levels L may differ between the N light receivers $R_1$ to $R_N$.

In the first embodiment, a signal level of a driving signal $Z_m$ provided to each light emitter $E_m$ differs between unit periods U (U1 and U2), and consequently, a light emission level of each light emitter $E_m$ varies within a light emission period $PE_m$. Furthermore, for each light receiver $R_n$, a light reception level L of the light receiver $R_n$ in one of the unit periods U within a light emission period $PE_m$ is selected as a detected value $d_{m,n}$. In other words, one of the light reception levels L (L1 and L2) when a light emitter $E_m$ is caused to emit light at different light emission levels is selected as a detected value $d_{m,n}$ for each light receiver $R_n$. Accordingly, it is possible to compensate for variabilities in light reception levels L among light receivers $R_n$ (and consequently, to accurately detect movement of each key 30). Additionally, in principle, there is no need for a voltage-dividing circuit (an array of resistive elements) that generates light reception signals by dividing a voltage that accords with a light reception level L of each light receiver $R_n$; or for an integrated circuit (multiplexer) for sequentially selecting a light reception signal from among light reception signals for each emission of light by a light emitter. Accordingly, compared to the technique disclosed in Patent Document 1, it is possible to reduce complexity of the configuration of a device. As described above, by the first embodiment, there is achieved an advantageous effect in that movement of each key 30 can be accurately detected while preventing the device configuration from becoming overly complex.

The detection controller 46 of FIG. 4 controls the movement detection processing SB described above as an example. Specifically, the detection controller 46 sets, for each light emitter $E_m$ (i.e., for each light emission period $PE_m$), the signal level $X1_m$ in the unit period U1 and the signal level $X2_m$ in the unit period U2. The detection controller 46 of the first embodiment sets a combination of the signal level $X1_m$ and the signal level $X2_m$ for each light emitter $E_m$, such that a light reception level L of each of the N light receivers $R_1$ to $R_N$ when a driving signal $Z_m$ at either the signal level $X1_m$ or the signal level $X2_m$ is provided to the light emitter $E_m$ is below a threshold value (upper limit) $L_{TH}$. The detection controller 46 sets the signal level $X1_m$ and the signal level $X2_m$ from signal levels A selected in advance. Additionally, the detection controller 46 of the first embodiment sets, for each combination of a light emitter $E_m$ and a light receiver $R_n$ (for each detector $D_{m,n}$), which of the light reception level L1 in the unit period U1 and the light reception level L2 in the unit period U2 should be selected (hereafter referred to as "selection target level") as a detected value $d_{m,n}$ by the detected value selector 44.

Figure 6:
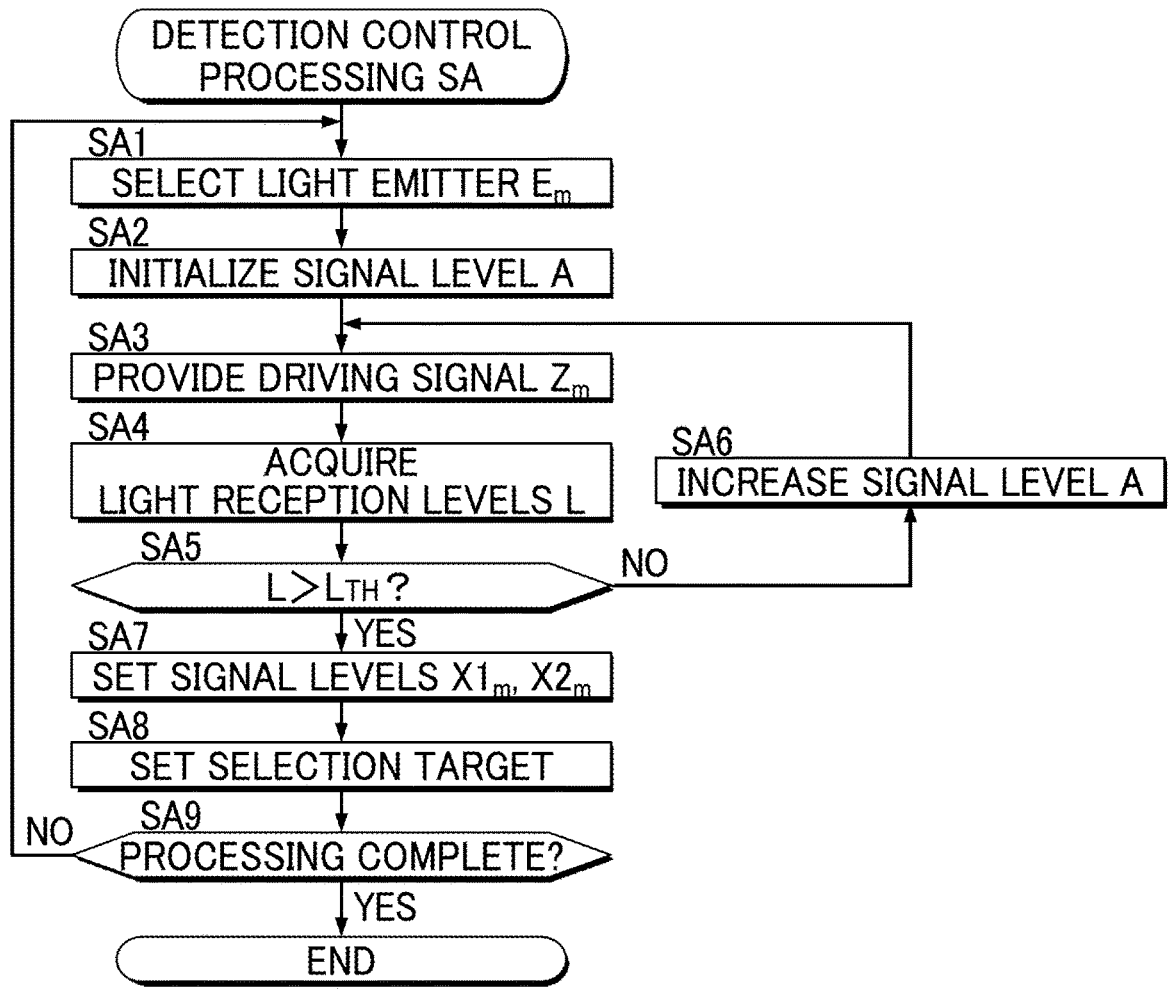
FIG. 6 is a flowchart illustrating detection control processing.

FIG. 6 is a flowchart illustrating processing (hereafter referred to as "detection control processing") SA that sets the signal level $X1_m$ and the signal level $X2_m$ for each light emitter $E_m$ and sets a selection target level for each detector $D_{m,n}$. The detection control processing SA of FIG. 6 is initiated with, for example, a start-up of the detection device 100 or an instruction from the user serving as a trigger, and after execution of the detection control processing SA, the movement detection processing SB is initiated. During execution of the detection control processing SA, all the keys 30 are kept in a key release status. In other words, detection light emitted from each light emitter $E_m$ reaches each of the N light receivers $R_1$ to $R_N$ without being shielded by the corresponding light shield 32.

After initiating the detection control processing SA, the detection controller 46 selects one (hereafter referred to as "selected light emitter $E_m$") of the M light emitters $E_1$ to $E_M$ (SA1). The detection controller 46 then sets a signal level A to an initial value, the signal level A being a candidate for a signal level $X1_m$ and a signal level $X2_m$ (SA2). The initial value of the signal level A is a smallest value among signal levels A selected in advance.

The detection controller 46 causes the selected light emitter $E_m$ to emit light by providing a driving signal $Z_m$ at the signal level A of the current phase to the selected light emitter $E_m$ (SA3). Detection light emitted from the selected light emitter $E_m$ reaches each of the N light receivers $R_1$ to $R_N$, and a light reception level L of each light receiver $R_n$ is output from the A/D converter 18. The detection controller 46 acquires from the A/D converter 18 the light reception level L of each of the N light receivers $R_1$ to $R_N$ (SA4). Since variabilities may exist in characteristics of each light receiver $R_n$ (e.g., a relationship between the light quantity actually reaching the light receiver $R_n$ and the light reception level L, which is a measured value), for example, the light reception level L acquired by the detection controller 46 at step SA4 can be different for each light receiver $R_n$.

The detection controller 46 determines whether the light reception level L of any of the N light receivers $R_1$ to $R_N$ is above the threshold value $L_{TH}$ (i.e., determines whether there is an overflow) (SA5). In a case where the light reception levels L of all the N light receivers $R_1$ to $R_N$ are below the threshold value $L_{TH}$ (SA5:NO), the detection controller 46 increases the signal level A by one grade (SA6) and the processing proceeds to step SA3. In other words, until a light reception level L of any one of the N light receivers $R_1$ to $R_N$ exceeds the threshold value $L_{TH}$ (SA5:YES), provision of a driving signal $Z_m$ to the selected light emitter $E_m$ (SA3) and acquisition of the light reception level L of each light receiver $R_n$ (SA4) are repeated in each case where the signal level A is increased from the initial value in a stepwise manner.

In a case where the light reception level L of any one of the N light receivers $R_1$ to $R_N$ is above the threshold value $L_{TH}$ (SA5:YES), the detection controller 46 sets the signal level $X1_m$ and the signal level $X2_m$ corresponding to the selected light emitter $E_m$ in accordance with the signal level A of the current phase (SA7). More specifically, the signal level $X1_m$ in the unit period U1 is set to a signal level A that is one grade below the signal level A of the current phase, and the signal level $X2_m$ in the unit period U2 is set to the signal level A of the current phase. The signal level $X1_m$ and the signal level $X2_m$ set in the above manner are stored in the storage device 14 for each light emitter $E_m$.

Figure 7:
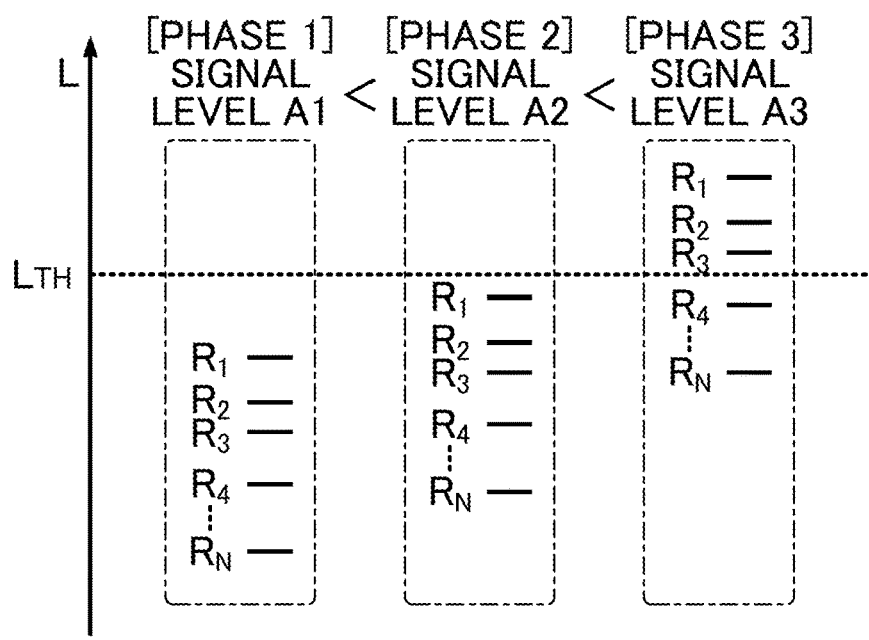
FIG. 7 is an explanatory diagram illustrating signal level setting performed in the detection control processing.

FIG. 7 is an explanatory diagram illustrating setting of the signal level $X1_m$ and the signal level $X2_m$. In FIG. 7, for each of cases (phase 1, phase 2, and phase 3) among which the signal level A is varied, there is illustrated a relationship between the light reception level L of each of the N light receivers $R_1$ to $R_N$ and the threshold value $L_{TH}$. The signal level A2 in phase 2 is above the signal level A1 in phase 1, and the signal level A3 in phase 3 is above the signal level A2 in phase 2 (A1<A2<A3).

In phase 1, the light reception levels L of all the N light receivers $R_1$ to $R_N$ are below the threshold value $L_{TH}$ (SA5:NO), and thus, the processing proceeds to phase 2 in which the signal level A2 that is one grade above the signal level A1 is used. Similarly, in phase 2, the light reception levels L of all the N light receivers $R_1$ to $R_N$ are below the threshold value $L_{TH}$ (SA5:NO), and thus, the processing proceeds to phase 3 in which the signal level A3 that is one grade above the signal level A2 is used. In phase 3, the light reception levels L of three light receivers $R_1$ to $R_3$, among the N light receivers $R_1$ to $R_N$, are above the threshold value $L_{TH}$ (SA5:YES). Accordingly, the signal level A2 in the preceding phase 2 is used as the signal level $X1_m$ in the unit period U1, and the signal level A3 in phase 3 is used as the signal level $X2_m$ in the unit period U2 (SA7).

After setting the signal level $X1_m$ and the signal level $X2_m$ corresponding to the selected light emitter $E_m$ in the above manner, the detection controller 46 sets, for each combination of the selected light emitter $E_m$ and each of the N light receivers $R_1$ to $R_N$, which of the light reception level L1 in the unit period U1 and the light reception level L2 in the unit period U2 (i.e., which of the unit period U1 and the unit period U2) should be selected when the movement detection processing SB is executed (SA8). More specifically, the detection controller 46 of the first embodiment adopts from among the signal level $X1_m$ and the signal level $X2_m$, as the selection target level in the movement detection processing SB, a signal level that results in the light reception level L of the light receiver $R_n$ being the largest of the two in a range below the threshold value $L_{TH}$ when a driving signal $Z_m$ at the subject signal level is provided to the selected light emitter $E_m$. For example, in the scenario shown in FIG. 7 as an example, the signal level $X1_m$ (=A2) is specified as the selection target level for the light receivers $R_1$ to $R_3$, and the signal level $X2_m$ (=A3) is specified as the selection target level for the rest of the light receivers $R_4$ to $R_N$.

Selection of the signal level $X1_m$ refers to selection of the light reception level L1 in the unit period U1, and selection of the signal level $X2_m$ refers to selection of the light reception level L2 in the unit period U2. Accordingly, the processing at step SA8, in which either the signal level $X1_m$ or the signal level $X2_m$ is specified as the selection target level, can be expressed as processing that specifies either the unit period U1 or the unit period U2 as the selection target level, or as processing that specifies the light reception level L1 or the light reception level L2 as the selection target level. The selection target level set in the above manner is stored in the storage device 14 for each combination of a light emitter $E_m$ and a light receiver $R_n$. The order of step SA7 and step SA8 may be reversed.

The detection controller 46 determines whether the above processing (SA1 to SA8) is complete for all of the M light emitters $E_1$ to $E_M$ in the movement detector 16 (SA9). In a case where the determination result is negative (SA9:NO), the detection controller 46 selects an unprocessed light emitter $E_m$ from among the M light emitters $E_1$ to $E_M$ as the selected light emitter $E_m$ (SA1), and executes the subsequent processing (SA2 to SA9) for the updated selected light emitter $E_m$. After the setting of the signal level $X1_m$ and the signal level $X2_m$ (SA7) and the setting of the selection target level (SA8) are complete for the M light emitters $E_1$ to $E_M$ (SA9:YES), the detection control processing SA of FIG. 6 comes to an end.

Figure 8:
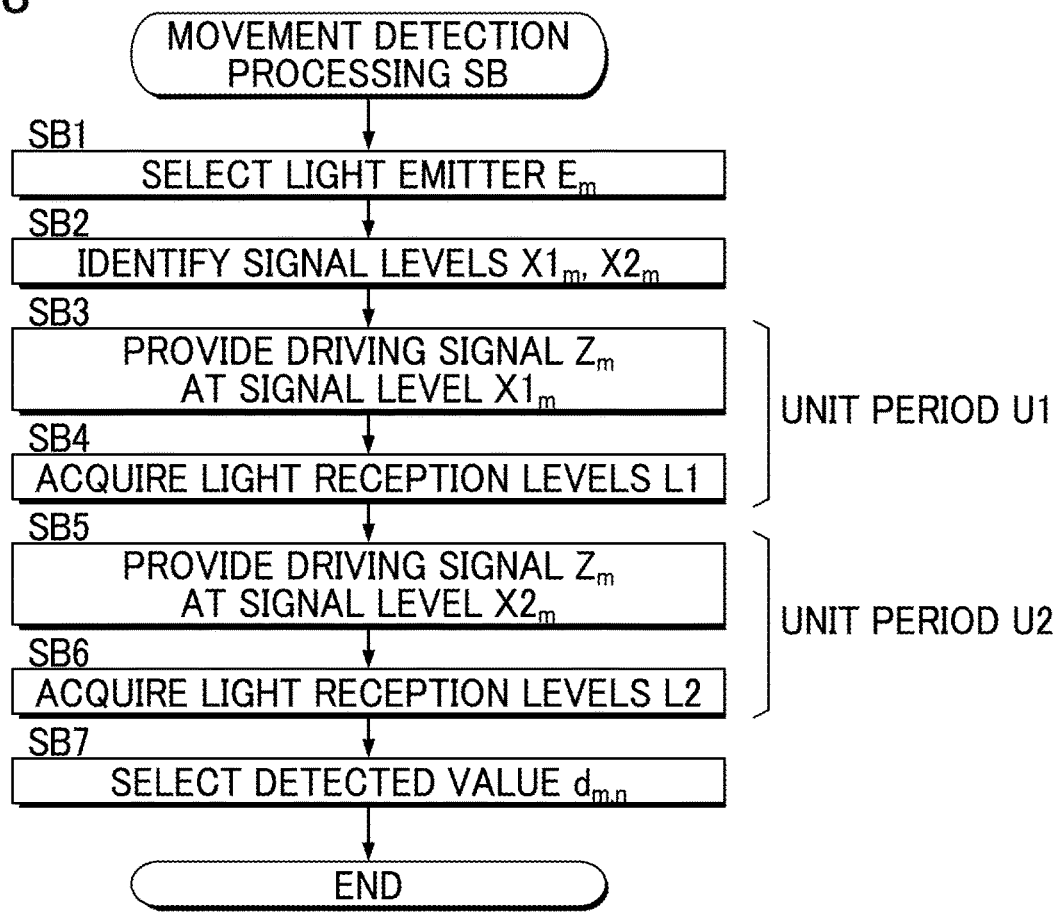
FIG. 8 is a flowchart illustrating movement detection processing.

FIG. 8 is a flowchart illustrating movement detection processing SB executed based on the result of the detection control processing SA described above as an example. With completion of the detection control processing SA or an instruction from the user serving as a trigger, the movement detection processing SB of FIG. 8 is executed for each of the M light emission periods $PE_1$ to $PE_M$ in each detection cycle P. After initiating the movement detection processing SB for a light emission period $PE_m$, the light emission controller 42 selects a light emitter $E_m$ (hereafter referred to as "driven light emitter $E_m$") that corresponds to the light emission period $PE_m$ from among the M light emitters $E_1$ to $E_M$ (SB1).

The light emission controller 42 identifies the signal level $X1_m$ and the signal level $X2_m$ set in the detection control processing SA with respect to the driven light emitter $E_m$ (SB2). More specifically, the light emission controller 42 acquires the signal level $X1_m$ and the signal level $X2_m$ for the driven light emitter $E_m$ from the storage device 14.

Upon arrival of the unit period U1 of the light emission period $PE_m$, the light emission controller 42 provides the driven light emitter $E_m$ with a driving signal $Z_m$ at the signal level $X1_m$ identified at step SB2, thereby causing the driven light emitter $E_m$ to emit light (SB3). The A/D converter 18 identifies N light reception levels L1 by A/D-converting detection signals $Q_n$ output by the N light receivers $R_1$ to $R_N$ during light emission by the driven light emitter $E_m$ in the unit period U1. The detected value selector 44 acquires the N light reception levels L1 of the light receivers $R_n$ from the A/D converter 18 (SB4).

Upon arrival of the unit period U2 of the light emission period $PE_m$, the light emission controller 42 provides the driven light emitter $E_m$ with a driving signal $Z_m$ at the signal level $X2_m$ identified at step SB2 with respect to the unit period U2, thereby causing the driven light emitter $E_m$ to emit light (SB5). The A/D converter 18 identifies N light reception levels L2 by A/D-converting detection signals $Q_n$ output by the N light receivers $R_1$ to $R_N$ during light emission by the driven light emitter $E_m$ in the unit period U2. The detected value selector 44 acquires the N light reception levels L2 of the light receivers $R_n$ from the A/D converter 18 (SB6).

As described in the above example, the light reception level L1 in the unit period U1 and the light reception level L2 in the unit period U2 are measured for each of the N light receivers $R_1$ to $R_N$. The detected value selector 44 selects, for each of the N light receivers $R_1$ to $R_N$, either the light reception level L1 or the light reception level L2 as a detected value $d_{m,n}$ (SB7). More specifically, the detected value selector 44 selects as the detected value $d_{m,n}$ the light reception level L in a unit period U, from among the unit period U1 and the unit period U2 in the light emission period $PE_m$, in which unit period U there is provided to the driven light emitter $E_m$ a driving signal $Z_m$ at the signal level ($X1_m$ or $X2_m$) specified as the selection target level in the detection control processing SA for a combination of the driven light emitter $E_m$ and a light receiver $R_n$. For example, the scenario shown in FIG. 7 can be assumed. For each of the light receivers $R_1$ to $R_3$, there is selected as the detected value $d_{m,n}$ the light reception level L1 acquired in the unit period U1 in which the driving signal $Z_m$ is set to the signal level $X1_m$ (=A2). For each of the rest of the light receivers $R_4$ to $R_N$, there is selected as the detected value $d_{m,n}$ the light reception level L2 acquired in the unit period U2 in which the driving signal $Z_m$ is set to the signal level $X2_m$ (=A3). In other words, as the detected value $d_{m,n}$ of each light receiver $R_n$, a light reception level L is adopted that is achieved when there is provided to the light receiver $R_n$ a driving signal $Z_m$ at a signal level that is largest in a range where the resultant light reception level L of the light receiver $R_n$ is below the threshold value $L_{TH}$.

By repeating the movement detection processing SB described above for each light emission period $PE_m$, there are sequentially generated detected values $d_{m,n}$ in each detection cycle P, wherein each detected values $d_{m,n}$ is in accordance with a status of each detector $D_{m,n}$ (movement of each key 30) corresponding to each combination of a light emitter $E_m$ and a light receiver $R_n$. The control device 12 analyzes a time series of detected values $d_{m,n}$ of each key 30 (change in displacement of each key 30 over time) to generate performance data.

As described above, in the first embodiment, a signal level in a range in which the light reception level L of a light receiver $R_n$ is below the threshold value $L_{TH}$, is set for each combination of a light emitter $E_m$ and a light receiver $R_n$. There is selected as a detected value $d_{m,n}$ a light reception level L of a light receiver $R_n$ in a unit period U in which there is provided to a light emitter $E_m$ a driving signal $Z_m$ at the signal level that has been set, the unit period U being among the unit period U1 and the unit period U2 within a light emission period $PE_m$. Thus, an advantageous effect is achieved in that detected values $d_{m,n}$ that are within an appropriate range below the threshold value $L_{TH}$ can be generated.

Second Embodiment

A second embodiment of the present invention will now be described. In each embodiment described below by way of example, elements with operations or functions similar to those in the first embodiment are denoted by the same reference signs as those used in the first embodiment, and detailed explanations of such elements are omitted, as appropriate.

Figure 9:
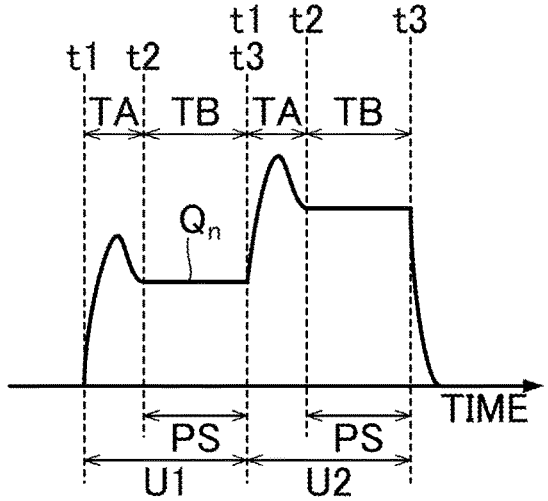
FIG. 9 is an explanatory diagram illustrating generation of a light reception level in a second embodiment.

In FIG. 9 there is shown a waveform of a detection signal $Q_n$ output by a light receiver $R_n$. Due to a transient response caused by capacity components accompanying the light receiver $R_n$, for example, a signal level (e.g., amount of current) of an actual detection signal $Q_n$ may change unsteadily. For example, as shown in FIG. 9, a signal level of a detection signal $Q_n$ may change unsteadily immediately after the light emission level of a light emitter $E_m$ changes at a start point t1 of a unit period U (U1 or U2).

In view of the above circumstances, in the second embodiment, A/D conversion of a detection signal $Q_n$ (generation of a light reception level L) by the A/D converter 18 is executed in a period (hereafter referred to as "stable period") PS in which a signal level of a detection signal $Q_n$ is stable within each unit period U. The stable period PS is, for example, a period between a time point t2, at which a predetermined time length TA (e.g., approximately 18 microseconds) has passed since a start point t1 of each unit period U, and an end point t3 of the unit period U. A time length TB of the stable period PS is approximately 20 to 23 microseconds, for example. The A/D converter 18 generates a light reception level L by starting the A/D conversion of a detection signal $Q_n$ at the time point t2, which is delayed by the time length TA relative to the start point t1 of the unit period U. The A/D conversion is not executed in a period over the time length TA from the start point t1 to the time point t2 of each unit period U (i.e., a period in which the signal level of the detection signal $Q_n$ changes unsteadily).

The detected value selector 44 of the second embodiment acquires light reception levels L (L1 and L2) within the stable periods PS in the unit periods U within the light emission period $PE_m$. Operation of the detected value selector 44 to select either the light reception level L1 in the unit period U1 or the light reception level L2 in the unit period U2 as the detected value $d_{m,n}$ is similar to that described in the first embodiment.

The second embodiment achieves advantageous effects similar to those achieved in the first embodiment. Furthermore, in the second embodiment, the detected value selector 44 acquires a light reception level L in a stable period PS in which the light reception level (the signal level of the detection signal $Q_n$) is stable within each unit period U. Accordingly, compared to a configuration in which the detected value selector 44 acquires a light reception level L in a period in which the signal level of the detection signal $Q_n$ changes unsteadily within each unit period U (e.g., a period from the start point t1 to the time point t2 of the unit period U), an advantageous effect is achieved in that accurate detected values $d_{m,n}$ can be generated, and consequently, movement of each key 30 can be accurately detected.

Alternatively, the A/D conversion of a detection signal $Q_n$ by the A/D converter 18 may be started at the start point t1 of a unit period U, and the detected value selector 44 may select a light reception level L in a stable period PS from among light reception levels L generated in the unit period U.

Third Embodiment

In the first embodiment and the second embodiment, examples are given in which each light emission period $PE_m$ includes two unit periods U (U1 and U2). However, the total number K of unit periods U in the light emission period $PE_m$ is not limited to two. In other words, each light emission period $PE_m$ may include three or more unit periods U.

Figure 10:
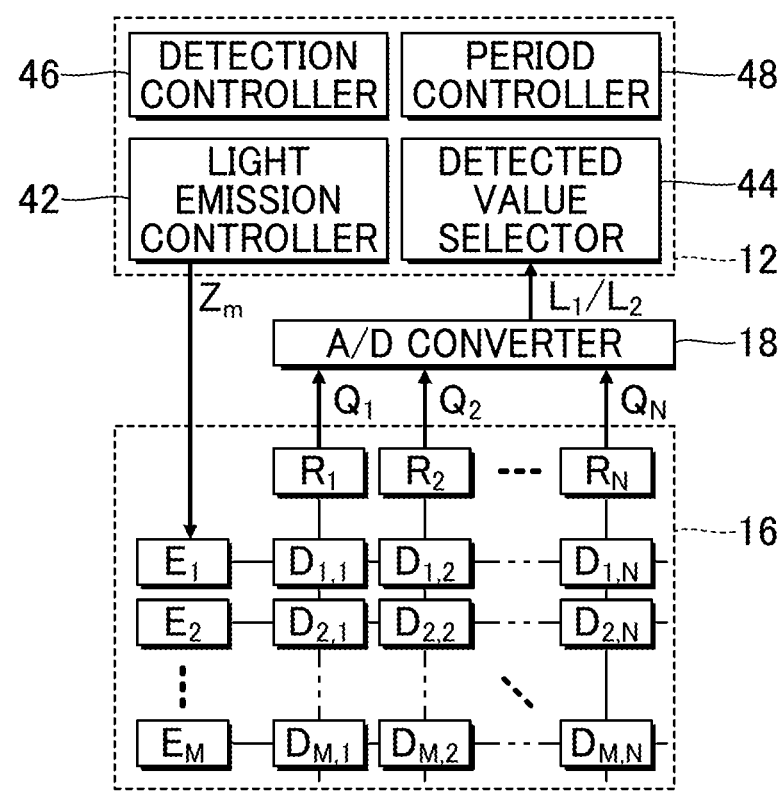
FIG. 10 is a diagram showing a configuration of a detection device in a third embodiment.

FIG. 10 is a diagram showing a configuration of a detection device 100 of a third embodiment with a focus on the functions of the control device 12. As shown in the example of FIG. 10, the control device 12 of the third embodiment serves as the elements (the light emission controller 42, the detected value selector 44, and the detection controller 46) described in the first embodiment, and also serves as a period controller 48. The period controller 48 controls the total number K of unit periods U within each light emission period $PE_m$ and the time length T of each unit period U. More specifically, the period controller 48 of the third embodiment controls the total number K of unit periods U within a light emission period $PE_m$ and the time length T of each unit period U in accordance with the time length TA from a start point of each unit period U to a time point t2 at which a signal level of a detection signal $Q_n$ becomes stable. The time length T of a unit period U is a sum of a time length TA, which is from the start point t1 to the time point t2 of the unit period U, and the time length TB of a stable period PS. Similarly to the second embodiment, the A/D converter 18 starts A/D conversion of a detection signal $Q_n$ at a time point t2 within the unit period U (at the start point of the stable period PS).

More specifically, in the detection control processing SA, the period controller 48 causes a light emitter $E_m$ to emit light by providing a driving signal $Z_m$ and analyzes detection signals $Q_n$ generated by the light receivers $R_n$ upon emission of light by the light emitter $E_m$, thereby measuring a time length TA (e.g., the maximum value among the N detection signals $Q_1$ to $Q_N$) from a start of light emission by the light emitter $E_m$ to a time point at which the signal levels of detection signals $Q_n$ become stable. The period controller 48 then sets the time length T of a unit period U to the sum of the time length TA and a predetermined time length TB. The time length TB of a stable period PS is fixed to a time length required by the A/D converter 18 to generate a light reception level L, for example. Accordingly, the total time length T of a unit period U is a length that may vary depending on the time length TA.

Additionally, the period controller 48 sets the total number K of unit periods U within a light emission period $PE_m$ in accordance with the time length T of the unit period U determined in the above manner. More specifically, the period controller 48 sets the total number K to the maximum number of unit periods U (time length T) that can be included in a light emission period $PE_m$ of a predetermined length. Thus, the shorter is a time length TA required for a signal level of a detection signal $Q_n$ to become stable, the greater is a total number K of unit periods U within a light emission period $PE_m$. A time length of a light emission period $PE_m$ and a time length of a detection cycle $P_m$ are each fixed to a predetermined value.

In the detection control processing SA, for the total of K unit periods U1 to UK, wherein the total number K has been set by the period controller 48, the detection controller 46 of the third embodiment sets signal levels ($X1_m$ to $XK_m$) for each light emitter $E_m$. More specifically, the detection controller 46 sets the signal levels $X1_m$ to $XK_m$ such that the light reception level L of each of the N light receivers $R_1$ to $R_n$ when a driving signal $Z_m$ at one of the signal levels $X1_m$ to $XK_m$ is provided to a light emitter $E_m$, is below the threshold value $L_{TH}$. Moreover, the detection controller 46 sets, the light reception level L of which unit period U, among the K unit periods U1 to UK within a light emission period $PE_m$, is to be selected as the detected value $d_{m,n}$ (selection target level) for each combination of a light emitter $E_m$ and a light receiver $R_n$.

In the movement detection processing SB, the light emission controller 42 causes a light emitter $E_m$ to emit light by providing a driving signal $Z_m$ at a signal level $Xk_m$ (k=1 to K) in each of the K unit periods U1 to UK within each light emission period $PE_m$ (SB3 and SB5). For each light emission period $PE_m$, the detected value selector 44 selects as the detected value $d_{m,n}$ a light reception level Lk in a unit period Uk corresponding to the signal level $Xk_m$ set as the selection target level in the detection control processing SA, the unit period Uk being among the K unit periods U1 to UK (SB7).

In the third embodiment, advantageous effects are achieved similar to those achieved in each of the first embodiment and the second embodiment. Moreover, in the third embodiment, the total number K of unit periods U within each light emission period $PE_m$ and the time length T of each unit period U are changed in accordance with a time length TA required for stabilization of a signal level of a detection signal $Q_n$. Accordingly, as is described in the above example, by a configuration in which the total number K of unit periods U increases as the time length TA becomes shorter, it is possible to accurately compensate for variabilities in light reception levels L for each light receiver $R_n$, and consequently, to accurately detect movement of each key 30.

Modifications

A variety of modifications can be made to each of the embodiment described above. Exemplary modifications are described below. Two or more modes freely selected from the examples below may be combined as appropriate.

(1) The relative strength of signal levels of a driving signal $Z_m$, in unit periods U within a light emission period $PE_m$ may be freely chosen. For example, in each embodiment described above, an exemplary configuration is described in which the signal level $X1_m$ in the unit period U1 is below the signal level $X2_m$ in the unit period U2. However, the signal level $X1_m$ may be above the signal level $X2_m$ (i.e., the light emission level of a light emitter $E_m$ may decrease stepwise within a light emission period $PE_m$).

(2) In the detection control processing SA in each embodiment described above, the signal level A of a driving signal $Z_m$ is increased stepwise from an initial value. Alternatively, provision of the driving signal $Z_m$ to the selected light emitter $E_m$ (SA3) and acquisition of a light reception level L of each light receiver $R_n$ (SA4) may be executed while the signal level A of a driving signal $Z_m$ is decreased stepwise from the maximum value. In a case where the signal level A is gradually decreased, the detection controller 46 determines whether the light reception level L of any one of the N light receiver $R_1$ to $R_N$ is below the threshold value $L_{TH}$. Alternatively or additionally, the signal level $X1_m$ or the signal level $X2_m$ that has been set in the past detection control processing SA (typically, the preceding detection control processing SA) may be used as an initial value (SA2) of the signal level A in the detection control processing SA.

(3) In the first embodiment, a combination of a signal level $X1_m$ and a signal level $X2_m$ is set for each light emitter $E_m$ such that the light reception level L is below the threshold value $L_{TH}$ when a driving signal $Z_m$ at either the signal level $X1_m$ or the signal level $X2_m$ is provided to the light emitter $E_m$. This configuration may be modified. For example, a combination of a signal level $X1_m$ and a signal level $X2_m$ may be set for each light emitter $E_m$ such that the light reception level L is above the threshold value (lower limit) $L_{TH}$ when a driving signal $Z_m$ at either the signal level $X1_m$ or the signal level $X2_m$ is provided to the light emitter $E_m$. As will be apparent from the above examples, the detection controller 46 is comprehensively described as an element that sets, for each combination of a light emitter $E_m$ and a light receiver $R_n$, signal levels that keep the light reception levels L of the N light receivers $R_1$ to $R_N$ within a predetermined range (a range below an upper limit or a range above a lower limit) when a driving signal $Z_m$ is provided to the light emitter $E_m$.

(4) In each embodiment described above, an exemplary detection device 100 that detects movement of each key 30 of the keyboard instrument 200 is described. However, an object to be detected by the detection device 100 is not limited to a key 30. For example, the detection device 100 similar to that described in each of the above embodiments may be used for detection of movement of each of hammers that strike strings in the keyboard instrument 200, or may be used for detection of movement of each of operating elements (e.g., buttons or tabs) operated freely by the user. As will be apparent from the above examples, an object to be detected by the detection device 100 can be comprehensively described as a movable moving body.

(5) As already stated, the detection device 100 described as an example in each of the above embodiments is realized by coordination between the control device 12 and the program. A program according to a preferred mode of the present invention causes a computer that is capable of controlling a movement detector 16 to serve as a light emission controller 42 and a detected value selector 44. The movement detector 16 includes M light emitters $E_1$ to $E_M$ and N light receivers $R_1$ to $R_N$, wherein in accordance with movement of a moving body among moving bodies (e.g., keys 30), each moving body corresponding to a different combination of a light emitter $E_m$ and a light receiver $R_n$, the light reception level L of the light receiver $R_n$ in the combination corresponding to the moving body changes. The light emission controller 42 causes each of the M light emitters $E_1$ to $E_M$ to sequentially emit light in each light emission period $PE_m$ by providing a driving signal $Z_m$, and to cause a signal level of the driving signal $Z_m$ to differ between unit periods U within the light emission period $PE_m$. The detected value selector 44 selects, for each light emission period $PE_m$, a light reception level L in one of the unit periods U within the light emission period $PE_m$ as a detected value $d_{m,n}$ for each of the N light receivers $R_1$ to $R_N$. The exemplary program described above may be stored in a computer-readable recording medium and be provided for installation in the computer. For example, the recording medium may be a non-transitory recording medium; a good example of which is an optical recording medium (optical disk), such as a CD-ROM. However, the recording medium can encompass any publicly known format, such as a semiconductor recording medium or a magnetic recording medium. The term "non-transitory recording medium" here includes all computer-readable recording medium except for a transitory, propagating signal; however, a volatile recording medium is not excluded. The program can be delivered to the computer by distribution via a communication network. The program can be distributed to the computer by distribution via a communication network.

(6) A preferred mode of the present invention may be understood as an operation method (detection method) in the detection device 100 in each of the embodiments described above as examples. A detection method (movement detection processing SB) according to a preferred mode of the present invention is implemented in a computer that is capable of controlling a movement detector 16 that includes M light emitters $E_1$ to $E_M$ and N light receivers $R_1$ to $R_N$, wherein in accordance with movement of a moving body among moving bodies (e.g., keys 30), each moving body corresponding to a different combination of a light emitter $E_m$ and a light receiver $R_n$, a light reception level L of the light receiver $R_n$ in the combination corresponding to the moving body changes. The detection method includes: causing each of the M light emitters $E_1$ to $E_M$ to sequentially emit light in each light emission period $PE_m$ by providing a driving signal $Z_m$, and causing a signal level of the driving signal $Z_m$ to differ between unit periods U within the light emission period $PE_m$; and selecting, for each light emission period $PE_m$, a light reception level L in one of the unit periods U within the light emission period $PE_m$ as a detected value $d_{m,n}$ for each of the N light receivers $R_1$ to $R_N$.

(7) From the above embodiments and modifications described as examples, the following configurations, for example, can be understood.

Mode 1

A detection device according to a preferred mode (mode 1) of the present invention includes: a movement detector configured to include light emitters and light receivers, wherein in accordance with movement of a moving body among moving bodies, each moving body corresponding to a different combination of one of the light emitters and one of the light receivers, a light reception level of the light receiver in a combination corresponding to the moving body changes; a light emission controller configured to cause each of the light emitters to sequentially emit light in each light emission period by providing a driving signal, and to cause a signal level of the driving signal to differ between unit periods within the light emission period; and a detected value selector configured to select, for each light emission period, a light reception level in one of the unit periods within the light emission period as a detected value for each of the light receivers. In the above configuration, the signal level (e.g., current value) of a driving signal provided to each light emitter is caused to differ between unit periods, thereby causing a light emission level of each light emitter to vary in a light emission period. A light reception level of each light receiver in one of the unit periods within the light emission period is selected as a detected value for each light receiver. Accordingly, it is possible to compensate for variabilities in the light reception levels between the light receivers, and consequently, to accurately detect movement of moving bodies. Furthermore, in principle it is not necessary to use a voltage-dividing circuit (an array of resistive elements) that generates light reception signals by dividing a voltage that accords with a light reception level of each light receiver; or to use an integrated circuit (multiplexer) for sequentially selecting a light reception signal from light reception signals for each emission of light by a light emitter. Thus, compared to the technique disclosed in Patent Document 1, it is possible to reduce the complexity of the device configuration.

Mode 2

The detection device according to a preferred mode (mode 2) of mode 1 further includes a detection controller configured to, for each combination of one of the light emitters and one of the light receivers, set signal levels such that a light reception level of the light receiver when a driving signal is provided to the light emitter falls within a predetermined range, wherein the light emission controller causes each light emitter to emit light by providing a driving signal at one of the signal levels in each unit period within the light emission period, and wherein the detected value selector selects, as the detected value, a light reception level of the light receiver in a unit period in which there is provided to the light emitter a driving signal at one of the signal levels set by the detection controller with respect to the combination of the light emitter and the light receiver, the unit period being among the unit periods within the light emission period. In this mode, signal levels are set for each combination of a light emitter and a light receiver such that a light reception level of the light receiver falls within a predetermined range (e.g., signal levels at which the light reception level is below a threshold value). A light reception level of a light receiver in a unit period, among unit periods within a light emission period, in which period a driving signal at one of the signal levels is provided to the light emitter, is selected as a detected value. Accordingly, it is possible to generate a detected value that is within an appropriate range.

Mode 3

In a preferred mode (mode 3) of mode 1 or 2, the detected value selector acquires a light reception level in a stable period within each of the unit periods in the light emission period, the stable period being a period in which the light reception level is stable, and selects a light reception level in one of the unit periods as the detected value. In this mode, the detected value selector acquires a light reception level in a stable period in which the light reception level is stable, the stable period being within a unit period. Thus, compared to a configuration in which the detected value selector acquires a light reception level in a period in which the light reception level changes unsteadily (e.g., a period immediately after a start point of a unit period), it is possible to generate an accurate detected value, and consequently, to accurately detect movement of each moving body.

Mode 4

The detection device according to a preferred mode (mode 4) of mode 3 further includes a period controller configured to control a total number of unit periods within the light emission period and a time length of each unit period in accordance with a time length from a start point of the unit period to a time point at which the light reception level becomes stable. In this mode, in accordance with a time length from a start point of a unit period to a time point at which a light reception level becomes stable, a total number of unit periods in a light emission period and a time length of each unit period are controlled. Accordingly, by increasing the total number of unit periods by shortening the time length of each unit period as the time length required for the light reception level to stabilize decreases, it is possible to accurately compensate for variabilities in light reception levels among light receivers.

Mode 5

In a preferred mode (mode 5) of any one of modes 1 to 4, the moving body is a key of a keyboard instrument. In this mode, it is possible to accurately detect movement of each key of a keyboard instrument.

Mode 6

A keyboard instrument according to a preferred mode (mode 6) of the present invention includes: keys; and a detection device configured to detect movement of each of the keys. The detection device includes: a movement detector configured to include light emitters and light receivers, wherein each of the keys corresponds to a different combination of one of the light emitters and one of the light receivers, and wherein in accordance with movement of a key among the keys, a light reception level of the light receiver in a combination corresponding to the key changes; a light emission controller configured to cause each of the light emitters to sequentially emit light in each light emission period by providing a driving signal, and to cause a signal level of the driving signal to differ between unit periods within the light emission period; and a detected value selector configured to select, for each light emission period, a light reception level in one of the unit periods within the light emission period as a detected value for each of the light receivers.

Mode 7

A program according to a preferred mode (mode 7) of the present invention causes a computer that controls a movement detector to execute light-emission control processing and detected-value selection processing. The movement detector includes light emitters and light receivers, wherein in accordance with movement of a moving body among moving bodies, each moving body corresponding to a different combination of each light emitter and each light receiver, a light reception level of the light receiver in a combination corresponding to the moving body changes. The light-emission control processing causes each of the light emitters to sequentially emit light in each light emission period by providing a driving signal, and causes a signal level of the driving signal to differ between unit periods within the light emission period; and the detected-value selection processing selects, for each light emission period, a light reception level in one of the unit periods within the light emission period as a detected value for each of the light receivers.

Mode 8

A detection method according to a preferred mode (mode 8) of the present invention is implemented in a computer that controls a movement detector configured to include light emitters and light receivers, wherein in accordance with movement of a moving body among moving bodies, each moving body corresponding to a different combination of each light emitter and each light receiver, a light reception level of the light receiver in a combination corresponding to the moving body changes. The computer causes each of the light emitters to sequentially emit light in each light emission period by providing a driving signal, and causes a signal level of the driving signal to differ between unit periods within the light emission period; and selects, for each light emission period, a light reception level in one of the unit periods within the light emission period as a detected value for each of the light receivers.

DESCRIPTION OF REFERENCE SIGNS

100 . . . detection device; 12 . . . control device; 14 . . . storage device; 16 . . . movement detector; 162 . . . light emission path; 164 . . . light guide; 166 . . . light guide; 168 . . . light reception path; 18 . . . A/D converter; 20 . . . sound source circuit; 22 . . . sound output device; 30 . . . key (moving body); 32 . . . light shield; 42 . . . light emission controller; 44 . . . detected value selector; 46 . . . detection controller; 48 . . . period controller; 200 . . . keyboard instrument; 210 . . . keyboard.

What is claimed is:

1. A detection device comprising:
a movement detector that includes light emitters and light receivers, wherein in accordance with movement of a moving body among moving bodies, each moving body corresponding to a different combination of one of the light emitters and one of the light receivers, a light reception level of the light receiver in a combination corresponding to the moving body changes; and
a processor coupled to a memory storing instructions that, when executed by the processor, configure the processor to:
cause each of the light emitters to sequentially emit light in each light emission period by providing a driving signal, and cause a signal level of the driving signal to differ between unit periods within the light emission period; and
select, for each light emission period, a light reception level in one of the unit periods within the light emission period as a detected value for each of the light receivers.

2. The detection device according to claim 1, wherein the processor is further configured to, for each combination of one of the light emitters and one of the light receivers, set signal levels such that a light reception level of the light receiver when a driving signal is provided to the light emitter falls within a predetermined range,
wherein in the causing of each of the light emitters to sequentially emit light, the processor causes each light emitter to emit light by providing a driving signal at one of the signal levels in each unit period within the light emission period, and
wherein in the selecting of a light reception level for each light emission period, the processor selects, as the detected value, a light reception level of the light receiver in a unit period in which there is provided to the light emitter a driving signal at one of the signal levels set with respect to the combination of the light emitter and the light receiver, the unit period being among the unit periods within the light emission period.

3. The detection device according to claim 1,
wherein in the selecting of a light reception level for each light emission period, the processor acquires a light reception level in a stable period within each of the unit periods in the light emission period, the stable period being a period in which the light reception level is stable, and selects a light reception level in one of the unit periods as the detected value.

4. The detection device according to claim 3, wherein the processor is further configured to control a total number of unit periods within the light emission period and a time length of each unit period in accordance with a time length from a start point of the unit period to a time point at which the light reception level becomes stable.

5. The detection device according to claim 1,
wherein the moving body is a key of a keyboard instrument.

6. A detection method implemented in a computer that controls a movement detector configured to include light emitters and light receivers, wherein in accordance with movement of a moving body among moving bodies, each moving body corresponding to a different combination of one of the light emitters and one of the light receivers, a light reception level of the light receiver in a combination corresponding to the moving body changes,
the detection method comprising:
causing each of the light emitters to sequentially emit light in each light emission period by providing a driving signal, and causing a signal level of the driving signal to differ between unit periods within the light emission period; and
selecting, for each light emission period, a light reception level in one of the unit periods within the light emission period as a detected value for each of the light receivers.

* * * * *